(12) United States Patent
Fielding et al.

(10) Patent No.: US 7,541,996 B2
(45) Date of Patent: Jun. 2, 2009

(54) SYSTEM AND METHOD FOR TOWING SUBSEA VERTICAL ANTENNA

(75) Inventors: Brian J. Fielding, Richmond, TX (US); Xinyou Lu, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 281 days.

(21) Appl. No.: 10/588,932

(22) PCT Filed: Dec. 6, 2004

(86) PCT No.: PCT/US2004/040764

§ 371 (c)(1),
(2), (4) Date: Aug. 9, 2006

(87) PCT Pub. No.: WO2005/081719

PCT Pub. Date: Sep. 9, 2005

(65) Prior Publication Data

US 2007/0135974 A1 Jun. 14, 2007

Related U.S. Application Data

(60) Provisional application No. 60/544,564, filed on Feb. 13, 2004.

(51) Int. Cl.
*H01Q 1/04* (2006.01)
(52) U.S. Cl. ........................ 343/719; 343/795
(58) Field of Classification Search .............. 343/709, 343/719, 793, 795
See application file for complete search history.

(56) References Cited

U.S. PATENT DOCUMENTS

| | | |
|---|---|---|
| 2,607,842 A | 8/1952 | Reid |
| 3,359,536 A | 12/1967 | Coburn |
| 4,173,748 A | 11/1979 | Lewandowski |
| 4,175,432 A | 11/1979 | Gibson |
| 4,372,359 A | 2/1983 | Hanson et al. |
| 4,617,518 A | 10/1986 | Srnka |
| 5,357,893 A | 10/1994 | Ruffa |
| 5,691,957 A | 11/1997 | Spiesberger |
| 5,841,733 A | 11/1998 | Bouyoucos et al. |
| 5,933,117 A * | 8/1999 | Gerhard ............... 343/709 |
| 6,253,627 B1 | 7/2001 | Lee et al. |

(Continued)

FOREIGN PATENT DOCUMENTS

GB 2390904 A * 1/2004

(Continued)

OTHER PUBLICATIONS

EP Standard Search Report No. 111286 dated Aug. 11, 2004, 1 page.

(Continued)

*Primary Examiner*—Trinh V Dinh
*Assistant Examiner*—Dieu Hien T Duong

(57) ABSTRACT

System and method for maintaining vertical alignment of the electrodes of a dipole antenna as it is towed submerged in water. The system includes a source of vertical tension on the antenna, a towline attachable to a tow vessel at one end and to a negatively buoyant tow body at the other, a source of balancing force to make the net vertical force on the antenna when submerged substantially zero, and at least two tag lines used in specified ways to connect the antenna to the tow body or directly to the towline.

14 Claims, 5 Drawing Sheets

U.S. PATENT DOCUMENTS

| | | |
|---|---|---|
| 6,533,627 B1 | 3/2003 | Ambs |
| 6,603,313 B1 | 8/2003 | Srnka |
| 6,883,452 B1 | 4/2005 | Gieseke |
| 6,901,029 B2 | 5/2005 | Raillon et al. |
| 2003/0050759 A1 | 3/2003 | Srnka et al. |

OTHER PUBLICATIONS

PCT International Search and Written Opinion dated Jul. 27, 2006, 5 pages.

* cited by examiner

SYSTEM AND METHOD FOR TOWING SUBSEA VERTICAL ANTENNA

This application claims the benefit of U.S. Provisional Patent Application No. 60/544,564 filed on Feb. 13, 2004.

FIELD OF THE INVENTION

This invention relates generally to the field of geophysical prospecting and, more particularly, to controlled source electromagnetic surveys (CSEM) in offshore environments. Specifically, the invention is an apparatus and method for towing an electric dipole transmitter antenna while maintaining the antenna in a vertical orientation.

BACKGROUND OF THE INVENTION

Electromagnetic soundings, including CSEM experiments, are conducted by transmitting an electromagnetic signal, typically a low-frequency periodic waveform, into the subsurface, and measuring the electromagnetic response. U.S. Pat. No. 6,603,313 to Srnka and U.S. Patent Publication No. 2003/0050759 (PCT Publication No. WO 03/025803) by Srnka and Carazzone disclose methods for using CSEM measurements to prospect for oil and gas, and to delineate known prospects. To date, marine CSEM surveys have employed horizontal electric dipoles (HED) as the source of electromagnetic fields. U.S. Provisional Patent Application No. 60/500,787 discloses certain advantages to using a vertical electric dipole (VED) transmitting antenna.

An electric dipole source may be made as follows. Two insulated wires are extended from the two output terminals of a power generator capable of supplying electrical power with a desired frequency and waveform. The other end of each insulated wire is connected to an electrode, or the insulation may be stripped from the end and the bare wire becomes the electrode. The current loop is completed in a marine application by the water, the sea bottom, and possibly the air above the water. (One advantage of the VED is that it generates negligible airwave contribution at the receiver, even in shallow water, improving the target signal.) The two electrodes are maintained a fixed distance apart, and the dipole axis is maintained in a horizontal posture in the case of an HED, or a vertical posture in the case of a VED. Marine CSEM experiments require, for efficiency, that the source antenna be towed by a vessel. Current sub-sea CSEM surveys use a horizontally oriented antenna to transmit electromagnetic waves. As illustrated in FIG. 1, one end of the antenna 11 is attached to a tow body 12, which is lowered to the desired water depth via a sub-sea tow cable 13. The subsea tow body 12 is more than just an anchor point for the towline. It provides a place to contain the sub-sea electrical components necessary for generating the electromagnetic source wave, and also may contain communication systems, positioning systems, speed of sound measuring devices, altimeters and the like. A winch (not shown), attached to a surface vessel 14, controls the tow cable. It is currently known how to design the antenna so that it trails horizontally behind the sub-sea tow body. The depth of the forward end of the HED is governed by the depth and location of the sub-sea tow body, and the antenna is kept at a constant depth (relative to the tow body) throughout its length by designing the antenna to be neutrally buoyant. Real time monitoring feeds precise location and depth coordinates back to the boat to ensure proper depth of the antenna. These methods will not work for a VED, because natural fluid dynamics will cause a towed object to orient itself in the position of minimum hydraulic resistance. This will be horizontal in the case of a dipole antenna. The generated electromagnetic fields will be a function of the geometry of the transmitter, i.e., the antenna dipole, and the electrical structures of the earth. By changing the location of the electrodes 15 to a vertical orientation instead of a horizontal orientation, the electromagnetic fields change with it. Although VED's are not so far known to have been towed in this manner, it is obvious that practical means must be found to maintain the dipole in a vertical orientation as it is towed through the water. The present invention satisfies this need

SUMMARY OF THE INVENTION

In one embodiment, the invention is a system for maintaining a flexible dipole antenna in a substantially vertical orientation and at a substantially constant depth when towed submerged in water, comprising: a source of vertical tension on the antenna; a towline attached to a tow vessel at one end, said towline having a length determined by the constant depth; a negatively buoyant tow body attached to the other end of the towline and to the antenna; and a source of a balancing force to make the net vertical force on the submerged antenna substantially zero.

In another embodiment, the invention is a method for maintaining a flexible dipole antenna in a substantially vertical orientation and at a substantially constant depth when towed submerged in water, comprising: providing vertical tension to the antenna; attaching one end of a towline to a tow vessel and the other end to a negatively buoyant tow body, said tow line having a length determined by said constant depth; attaching the antenna to the tow body; and balancing the vertical forces on the submerged antenna to a substantially zero net force.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method and system for maintaining an electric dipole source in a vertical orientation as it is towed in a horizontal direction underwater.

Dual Tag Lines

Figure 1:
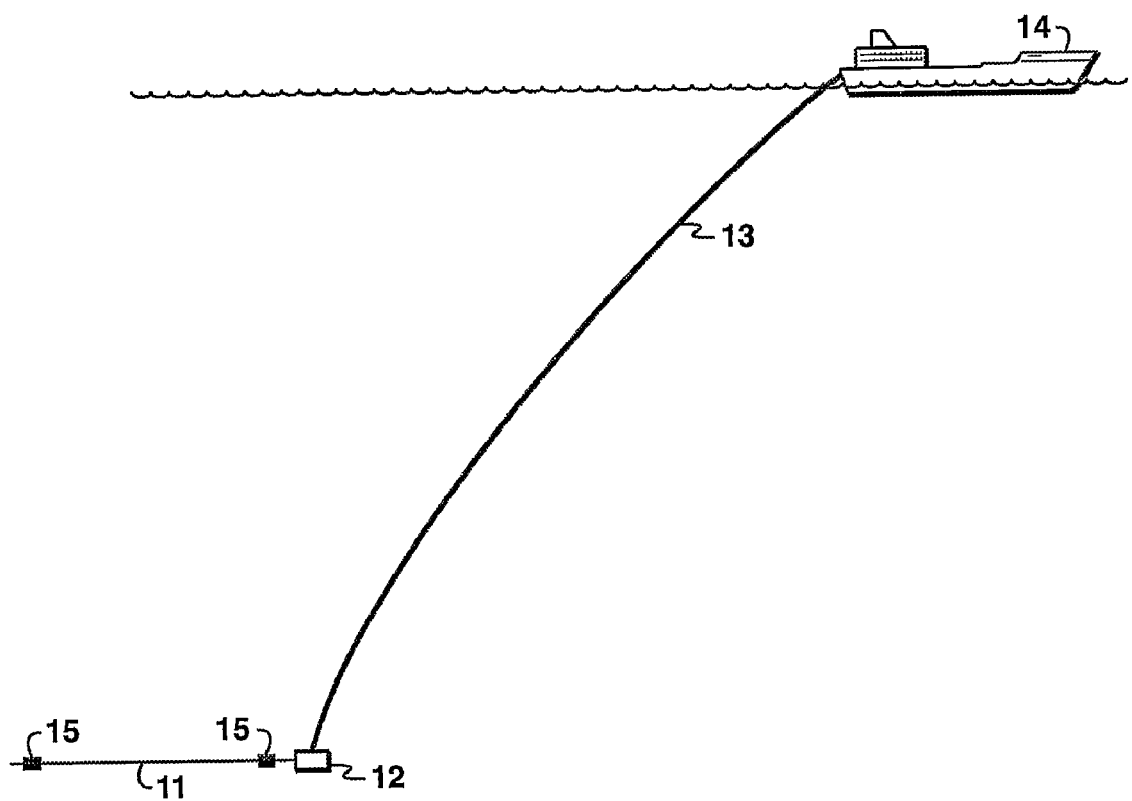
FIG. 1 illustrates a horizontal electric dipole source towed through water by a vessel.
Figure 2:
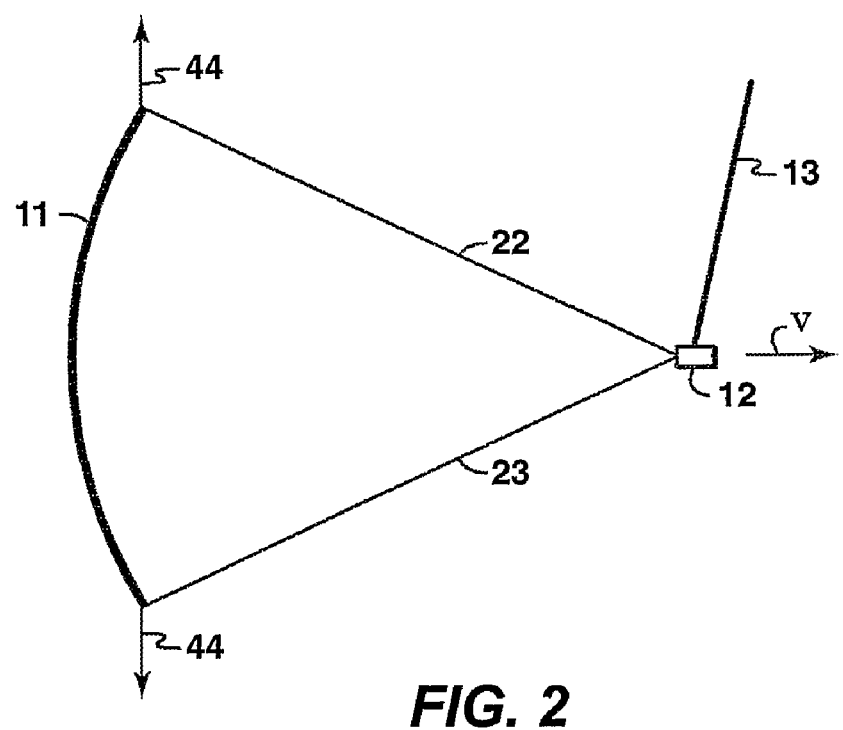
FIG. 2 illustrates a vertical dipole antenna with dual tag lines.
Figure 3:
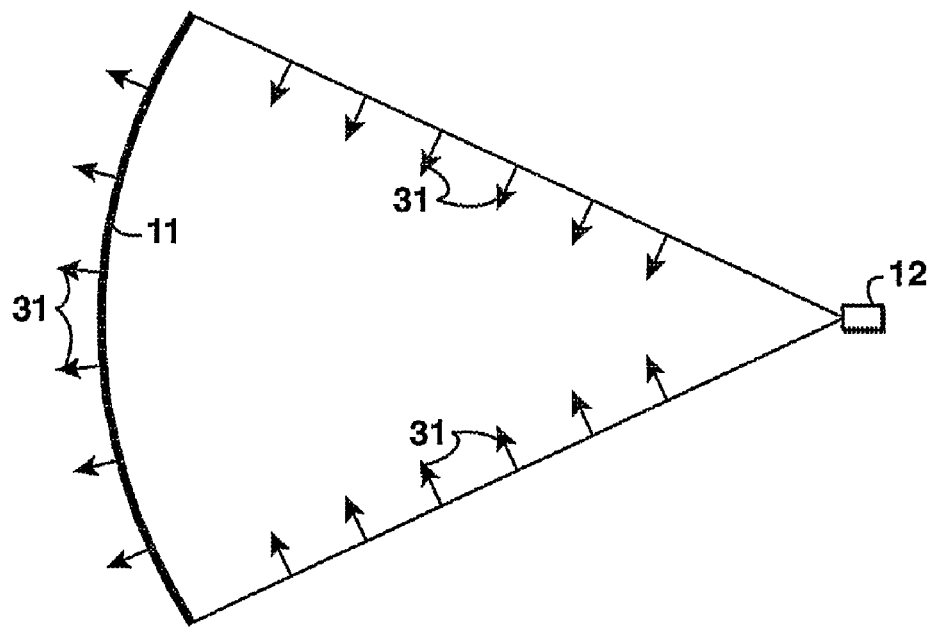
FIG. 3 illustrates the fluid resistance forces on a towed vertical antenna with dual tag lines.

In one embodiment of the present invention, illustrated in FIG. 2, the dipole antenna 11 is connected by two tag lines. The upper tag line 22 connects the upper end of the antenna to the sub-sea tow body 12, and the lower tag line 23 connects the lower end of the antenna to the sub-sea tow body. The electrodes are not shown in this drawing, but they are at either end of antenna 11. The antenna must be made of a material with some structural integrity, to maintain a (preferably constant) separation of the electrodes. Vertical tension 44 is applied on the antenna to keep it oriented in a vertical direction. As shown in FIG. 3, natural fluid dynamics attempt to collapse the antenna, thus requiring tension forces to counteract the fluid forces, which are indicated by the arrows 31. Collapse could be prevented by putting the electrodes on the ends of a rigid rod, but this is impractical because the dipole length needed is typically on the order of 50-200 meters or more. In any embodiment of the invention, whether using dual tag lines or not, vertical tension on the antenna is achieved through any of several sources of force or a combination thereof, usually located at the upper and/or lower ends of the antenna:

Wings (fixed or adjustable);
Buoyancy devices (e.g., flotation collars, buoyancy cans, or glass flotation balls);
Added weight;
Thrusters;
Kite/parachute devices.

Buoyancy devices and kites or parachutes obviously can provide only the upward tension component, and added weight only the downward component. Thrusters and wings, adapted to travel submerged in water, can be adjusted or operated to provide either an upward force component at the top of the antenna, or a downward force component at the lower end of the antenna. In most embodiments, thrusters would be oriented primarily in the vertical direction, but in some embodiments may have a horizontal force component as well.

Figure 4:
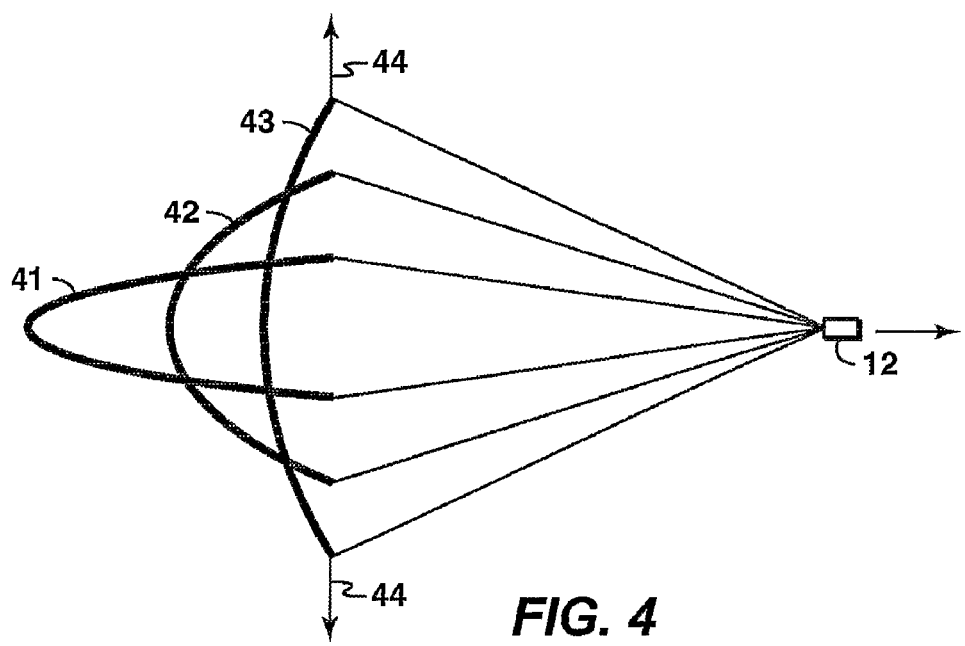
FIG. 4 illustrates the effect of different degrees of vertical tension applied to the vertical antenna of FIG. 2.

The shape of the antenna will vary as a function of the amount of tension applied. FIG. 4 shows how the antenna profile can change as tension 44 is increased (tension increases from profile 41 through profile 42 to profile 43) on the configuration of FIG. 2. Without a source of vertical tension, the antenna will not tow in a vertical orientation. The present invention requires a source of vertical tension such as one of the above-described devices, or the equivalent. All such equivalents shall be deemed to be part of the present invention. The primary function of the vertical tension is to maintain the electrodes in a substantially vertical line with substantially constant separation between the electrodes. The length of the towrope will limit the depth of travel of the antenna in the water. In preferred embodiments of the invention, the sub-sea tow body has negative buoyancy, and will settle to a depth determined by the length of the towrope and the speed of the ship. In such embodiments, the preferred antenna will have a net buoyancy, including the vertical tension forces, of substantially zero ("neutral buoyancy"), i.e., the vertical forces on the antenna will be balanced to a net zero force. In such a preferred configuration, the tag lines supply only a horizontal force and the antenna tows directly behind the tow body, with the vertical tension providing the desired vertical orientation. In many embodiments of the invention, the forces that supply the vertical tension are adjusted to balance the vertical forces on the antenna.

Extra Tag Lines

Figure 5:
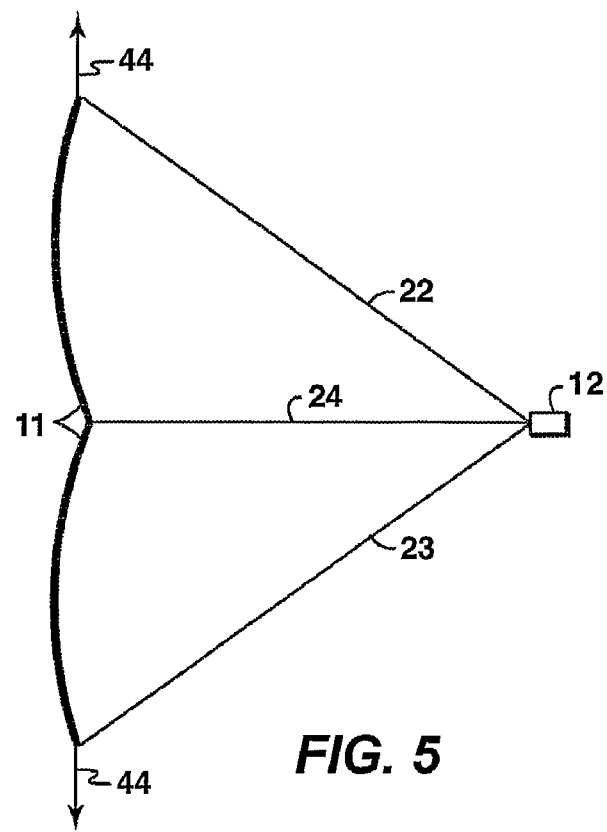
FIG. 5 illustrates a vertical antenna with three tag lines.

In some embodiments of the invention, one or more extra tag lines are added to the system to balance out the drag force exerted by the water on the antenna, and therefore to achieve a more vertical orientation. FIG. 5 illustrates a configuration with a third tag line 24; however, additional tag lines could be added to stabilize the antenna to the degree desired. Each added tag line will help reduce the natural bow in the antenna. An added option to this design is to install a winch (not shown) on the sub-sea tow body 12 to haul in or pay out the tag line(s) until the most consistently vertical antenna shape is achieved. Even in this configuration, vertical tension 44 is still required to keep the antenna upright.

Variable Density Antenna

Figure 6:
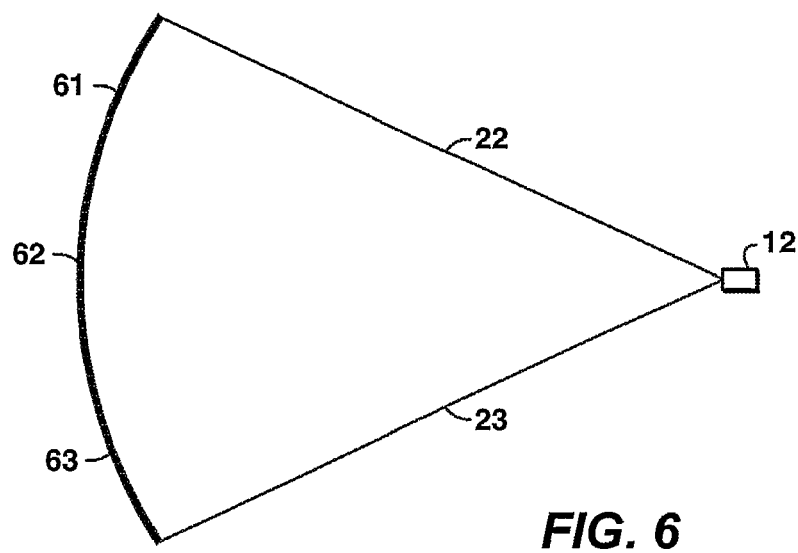
FIG. 6 illustrates vertical tension supplied by a variable density antenna.

In one embodiment of the present invention, the necessary vertical tension is provided by designing a variable density antenna. The upper sections 61 of the antenna are made positively buoyant, the center sections 62 are neutrally buoyant, and the lower sections 63 are negatively buoyant, as illustrated in FIG. 6. The antenna design improves, for the purposes of the present invention, as the center of mass is lowered and the center of buoyancy is raised higher. The moment arm for the torque couple that orients the antenna in the vertical direction is proportional to the distance between the center of mass and the center of buoyancy. A variable density antenna can facilitate in separating the centers of mass and buoyancy. Other ways of achieving vertical tension also are improved by separating the point of application of a torque couple. For example, a pair of wings should preferably be mounted at the upper and lower ends of the antenna, thereby using the entire length of the antenna as a moment arm.

Horizontal Tag Lines

Figure 7A:
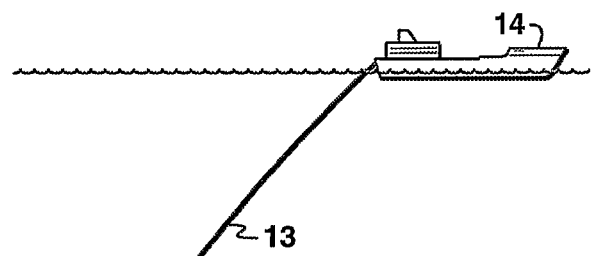
FIG. 7 illustrates use of horizontal tag lines.
Figure 7B:
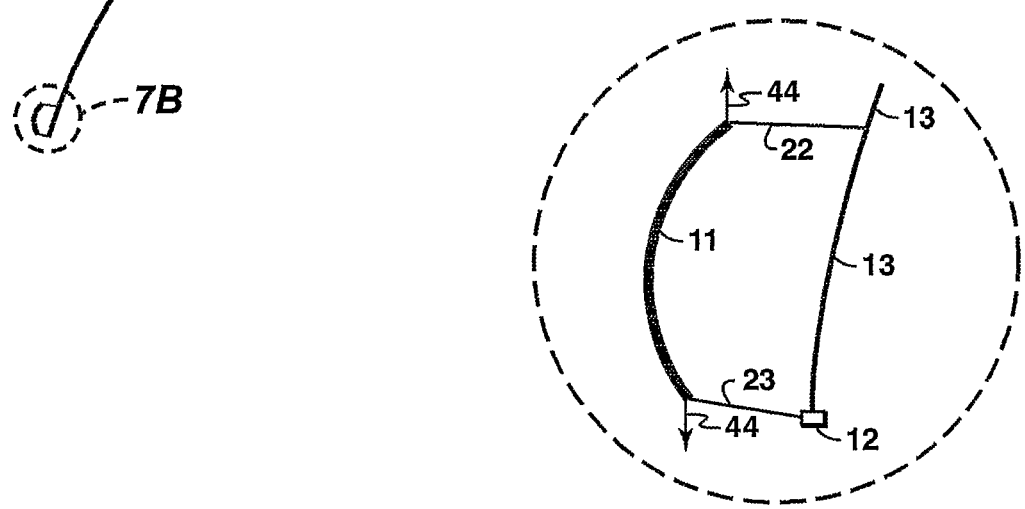

In other embodiments of the present invention, the two tag lines are placed substantially horizontally, as illustrated in FIG. 7A, with an expanded view of the antenna and tag lines shown in FIG. 7B. The upper tag line 22 extends horizontally from the top of the antenna 11 to the towline 13. The lower tag line 23 is connected, also horizontally, from the bottom of the antenna to the sub-sea tow body 12. Drag forces on the horizontal tag lines are significantly less than non-horizontal tag lines such as those of FIG. 2. Additional devices (not shown) may be added to the tag line attachment points, such as winches that can pull in or pay out tag line cable, to facilitate orienting the dipole in the vertical direction. The tag lines can vary in length, with one embodiment being eliminating the lower tag line and attaching the bottom end of the VED to the sub-sea tow body. FIG. 7B shows two horizontal tag lines, but more than two can be used. Although the horizontal lines add desired stability (the shorter the lines, the more stability), a source of vertical tension is still needed. A variable density antenna is a preferred vertical tension source for this configuration.

Hanging Antenna

Figure 8:
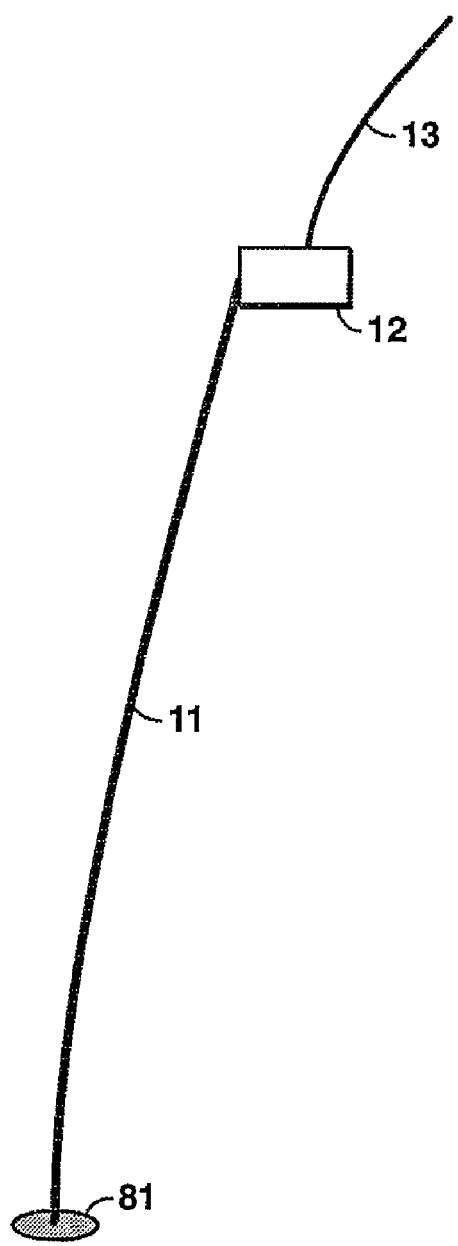
FIG. 8 illustrates the hanging antenna configuration.
Figure 9:
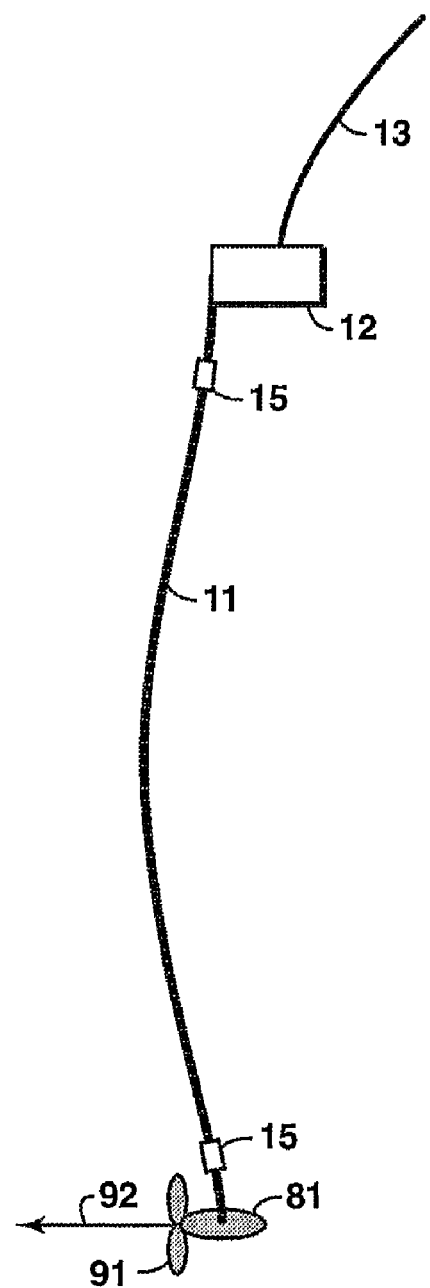
FIG. 9 illustrates the hanging antenna with thruster.

In a different embodiment of the present invention, the tag lines are eliminated altogether by attaching one end of the antenna 11 directly to the sub-sea tow body 12 and attaching a weight 81 at the other end, as illustrated in FIG. 8. The free end will hang down and lie back from the attachment point as a function of the following: total weight attached to the free end, tow speed, antenna size and weight, antenna length, and drag on the system. To reduce the layback of the free end of the antenna, several options can be implemented. First, the antenna is preferably made of a high-density material, with high tensile strength to handle large tension forces. This will allow a heavier mass to be added to the free end of the antenna without compromising the integrity of the antenna. To ensure the electrodes are oriented vertically, a thruster can be added to the antenna free end. An example of a thruster is a torpedo (without explosive), or any similar self-propelled, directionally controllable device. The force 92 generated by the thruster 91 can overcome the fluid resistance forces on the antenna 11 to ensure vertical alignment of the upper and lower electrodes 15, as illustrated in FIG. 9. In the embodiments of FIGS. 8 and 9, the towline 13 supplies the upward vertical tension on the antenna.

The foregoing description is directed to particular embodiments of the present invention for the purpose of illustrating it. It will be apparent, however, to one skilled in the art, that many modifications and variations to the embodiments described herein are possible. For example, many of the concepts disclosed herein can be combined either fully or partially. Also, it is obviously possible to separate the sinker function of the sub-sea tow body from the place where necessary positioning and other equipment is stored and protected from water. All such modifications and variations are intended to be within the scope of the present invention, as defined by the appended claims.

We claim:

1. A system for maintaining a flexible dipole antenna in a substantially vertical orientation and at a substantially constant depth when towed submerged in water, comprising:
   (a) a source of vertical tension on the antenna;
   (b) a towline attached to a tow vessel at one end, said towline having a length determined by the constant depth;
   (c) a negatively buoyant tow body attached to the other end of the towline and to the antenna; and
   (d) a source of a balancing force to make the net vertical force on the submerged antenna substantially zero;
   (e) at least two tag lines interposed between the antenna and the tow body, each tag line being attached at one end to the tow body and at the other end to separated locations on the antenna.

2. The system of claim 1, wherein the source of vertical tension is an upward force source and an offsetting downward force source, said two forces having magnitudes sufficiently large to pull the antenna into substantially vertical configuration, and differing in magnitude by an amount substantially equal to said balancing force.

3. The system of claim 2, wherein the upward force source is at least one of the following sources of force, attached to one end of the antenna:
   (a) a kite;
   (b) a parachute;
   (c) a thruster;
   (d) a water wing;
   (e) a buoyancy device;
   (f) the towline;
   and the downward force source is at least one of the following sources of force, attached to the other end of the antenna:
   (a) a weight;
   (b) a thruster;
   (c) a water wing.

4. The system of claim 1, wherein there are two tag lines of substantially equal length, each attached to a different end of the antenna.

5. The system of claim 4, further comprising a third tag line, attached at one end to the antenna substantially at the antenna's mid-point, and at the other end to the tow body, the length of said third tag line being determined by verticality considerations.

6. The system of claim 1, wherein the antenna is a variable density antenna, said density variability being designed to provide the vertical tension and the balancing force.

7. The system of claim 1, wherein the tow body provides a place for equipment such as communication, positioning and measurement equipment.

8. A system for maintaining a flexible dipole antenna in a substantially vertical orientation and at a substantially constant depth when towed submerged in water, comprising:
   (a) a source of vertical tension on the antenna;
   (b) a towline attached to a tow vessel at one end, said towline having a length determined by the constant depth;
   (c) a negatively buoyant tow body attached to the other end of the towline and to the antenna;
   (d) a source of a balancing force to make the net vertical force on the submerged antenna substantially zero; and
   (e) a tag line interposed between the tow body and one end of the antenna and attached to each, and a second tag line connecting the other end of the antenna and a point on the towline, said point on the tow line being determined such that the tag lines are substantially horizontal, said tag lines having relative lengths determined by verticality considerations when the antenna is towed.

9. A method for maintaining a flexible dipole antenna in a substantially vertical orientation and at a substantially constant depth when towed submerged in water, comprising:
   (a) providing vertical tension to the antenna;
   (b) attaching one end of a towline to a tow vessel and the other end to a negatively buoyant tow body, said tow line having a length determined by said constant depth;
   (c) attaching the antenna to the tow body;
   (d) balancing the vertical forces on the submerged antenna to a substantially zero net force; and
   (e) interposing at least two tag lines between the tow body and the antenna, each tag line being attached at one end to the tow body and at the other end to separated location on the antenna.

10. The method of claim 9, wherein the vertical tension and the balancing force are provided by an upward force and an offsetting downward force, said upward and downward forces being sufficiently large to pull the antenna into a substantially vertical position, and being sufficiently different to substantially balance the vertical forces on the antenna.

11. The method of claim 10, wherein the upward force is provided by at least one of the following, attached to one end of the antenna:
   (a) a kite;
   (b) a parachute;
   (c) a thruster;
   (d) a water wing;
   (e) a buoyancy device;
   (f) the towline;
   and the downward force is provided by at least one of the following, attached to the other end of the antenna:
   (a) a weight;
   (b) a thruster;
   (c) a water wing.

12. The method of claim 9, wherein the vertical tension and the balancing force are provided by using a variable density antenna.

13. The method of claim 9, wherein there are two tag lines of substantially equal length, each attached to a different end of the antenna.

14. The method of claim 13, further comprising a third tag line, attached at one end to the antenna substantially at the antenna's mid-point, and at the other end to the tow body, the length of said third tag line being determined by verticality considerations.

* * * * *

UNITED STATES PATENT AND TRADEMARK OFFICE
CERTIFICATE OF CORRECTION

| | |
|---|---|
| PATENT NO. | : 7,541,996 B2 |
| APPLICATION NO. | : 10/588932 |
| DATED | : June 2, 2009 |
| INVENTOR(S) | : Brian J. Fielding and Xinyou Lu |

It is certified that error appears in the above-identified patent and that said Letters Patent is hereby corrected as shown below:

Column 6, line 33, "location" should be changed to --locations--.

Signed and Sealed this

Third Day of November, 2009

David J. Kappos
*Director of the United States Patent and Trademark Office*